United States Patent [19]
Watanabe et al.

[11] Patent Number: 5,393,968
[45] Date of Patent: Feb. 28, 1995

[54] METHOD AND DEVICE FOR READING BAR CODE

[75] Inventors: Mitsuo Watanabe; Shinichi Sato; Hiroaki Kawai; Ichiro Shinoda, all of Kawasaki, Japan

[73] Assignee: Fujitsu Limited, Japan

[21] Appl. No.: 113,596

[22] Filed: Aug. 27, 1993

[30] Foreign Application Priority Data

Mar. 19, 1993 [JP]  Japan .................................. 5-060733

[51] Int. Cl.6 ............................................. G06K 7/10
[52] U.S. Cl. ................................................. 235/462
[58] Field of Search ................................. 235/463, 462

[56] References Cited

U.S. PATENT DOCUMENTS 4,879,456  11/1989  Cherry et al. .................. 235/463 X
5,166,500  11/1992  Yoon et al. ....................... 235/463
5,245,167   9/1993  Takenaka ........................ 235/463 X Primary Examiner—Donald Hajec
Assistant Examiner—Jeffrey R. Filipek
Attorney, Agent, or Firm—Greer, Burns & Crain, Ltd.

[57] ABSTRACT

The present invention relates to a bar code reading method and a bar code reader applied preferably to POS systems used in the distribution industry. The object of the invention is to achieve an improved reading ratio or a reduced erroneous reading ratio in practical use by evaluating quantitatively the reliability of demodulation data and by performing a coincidence checking plural times only when a large error is recognized. When a reading distortion amount measured is within a predetermined allowable value, data extracted and demodulated from the bar code is judged to be valid, whereby the bar code reading is completed. When a reading distortion amount measured is not within the predetermined allowable value, if the same data from the bar code is extracted and demodulated continuously and at least twice, the same data extracted and demodulated from the bar code is judged to be valid, whereby the bar code reading is completed.

24 Claims, 13 Drawing Sheets

|  | TO1 MODULE NUMBER | | | |
|---|---|---|---|---|
|  | 2 | 3 | 4 | 5 |
| 2 | E6 | 00 | E4 | 06 |
| 3 | 09 | E2 | 01 | E5 |
|  |  | E8 | 07 |  |
| 4 | E9 | 02 | E1 | 05 |
|  |  | 08 | E7 |  |
| 5 | 06 | E0 | 04 | E3 |

TO2 MODULE NUMBER

METHOD AND DEVICE FOR READING BAR CODE

BACKGROUND OF THE INVENTION

1) Field of the Invention

The present invention relates to a bar code reading method and a bar code reading device that are employed for POS systems used in the distribution industry.

2) Description of the Related Arts

FIG. 9 is a block diagram showing a structure of a bar code reader. Referring to FIG. 9, numeral 1 represents a bar code printed on a surface of an article. The bar code 1 is formed generally of plural black bars and plural white bars alternately arranged and indicates a piece of predetermined data based on the widths of each black bar and each white bar.

An optical system 2 irradiates a laser beam to the bar code 1 and then receives the light reflected back from the bar code 1. The optical system 2 is formed of a laser emitting unit 3, a scanning mechanism 4, and a photoelectric converting unit 5. The laser emitting unit 3 includes a semiconductor laser for emitting a laser beam L1.

The scanning mechanism 4 is formed, for example, of a polygon mirror driven rotatably by a motor. The scanning mechanism 4 reflects the laser beam L1 from the laser emitting unit 3 and irradiates a laser beam L2 onto the black bars and white bars forming the bar code 1. The scanning mechanism 4 moves at a fixed rate while it scans the laser beam perpendicularly to the black bars and the white bars.

The scanning mechanism 4 reflects as a reflection light R1 the L2 from the bar code 1, and irradiates it as a reflection light R2 to the photoelectric converting unit 5.

The photoelectric converting unit 5 is formed, for example, of a photoelectric converting element such as a photo diode, and converts the reflection light R2 (optical input signal) received via the scanning mechanism 4 into an electric signal (analog value) corresponding to the light amount thereof, and outputs the electric signal.

Referring to FIG. 9, an A/D converter 6 converts an electric signal outputted from the photoelectric converting unit 5 to a signal in a digital form. The A/D converter 6 converts an electric signal from the photoelectric converting unit 5 to a binary signal in a digital form which includes a black level signal corresponding to each black bar portion in the bar code 1 and a white level signal corresponding to each white bar portion in the bar code 1. As for the binary signal, since the light amount of the light R2 reflected back from each white bar portion is usually larger than that from each black bar portion, the white level signal is obtained as a high level signal while the black level signal is obtained as a low level signal.

A bar width counter 7 counts clock signals from the clock generator 8. The bar width counter 7 outputs, as a clock signal counting value the time width of the black level signal portion and white level signal portion of a binary signal from the AID converter 6, or the values corresponding to each black bar width and each white bar width of an actual bar code 1.

Furthermore, a memory 9 stores a counted value corresponding to a bar width from the bar width counter 7, and numeral 10 represents a CPU. The CPU 10 extracts and demodulates predetermined data of the bar code 1 based on the counted value (a value corresponding to each black bar width or a value corresponding to each white bar width) stored in the memory 9.

In the above structure, the scanning mechanism 4 irradiates the laser beam L1 from the laser emitting unit 3 as a laser beam L2 to the black bars and white bars of the bar code 1. The scanning mechanism 4 is travels at a fixed rate while it scans perpendicularly to the black bars and the white bars of the bar code 1.

The laser beam L2 irradiated from the scanning mechanism 4 is scattered and reflected on a portion of the bar code 1 and reentered as a reflection light R1 to the scanning mechanism 4. The reflection light R1 travels while the reflection angle varies with the scanning movement of the laser beam L2. The reflection light R1 enters as a reflection light R2 the photoelectric converting element of the photoelectric converting unit 5 arranged at a predetermined position since it is reflected by the polygon mirror forming the scanning mechanism 4.

The photoelectric converting unit 5 converts the reflection light R2 into an electric signal corresponding to the light amount. The A/D converter 6 converts the electric signal into a digital signal or a binary signal having a black level signal corresponding to each black bar portion of the bar code 1 and a white level signal corresponding to each white bar portion of the bar code 1.

Then the bar width counter 7 counts the clock signals from the clock generator 8. The time widths of the black level signal portion and the white level signal portion of the binary signal from the A/D converter 6 (or values corresponding to each black bar width and each white bar width of an actual bar code 1) is measured as a counted value of a clock signal. The counted value is stored once in the memory 9. The CPU 10 subjects the bar width counted value stored in the memory 9 to a predetermined demodulating process to extract and demodulate a predetermined data of the bar code 1.

As described in FIG. 9, the bar code 1, as shown in FIG. 10, has plural black bars 1B and white bars 1W arranged alternatively one another. A predetermined data is represented based on the width of each black bar 1B and the width of each white bar 1W. The black bar 1B and the white bar 1W are arranged by counting a predetermined criterion length as one module having a width which is a natural number multiplied by (for example, 1 to 4 being a module number) the one module.

In concrete form, as shown in FIG. 10, the bar code 1 includes the guide bar GB arranged on the left side and the special center bar SCB arranged on the right side. The guide bar GB is formed of two black bars 1B and the one white bar 1W arranged between the black bars 1B, and the special center bar SCB is formed of three black bars 1B and three white bars 1W arranged between the black bars. The black bar 1B and the white bar 1W have a module number of one, respectively.

The guide bar GB and the special center bar SCB are arranged to define both ends of the bar code 1. For example, the character portions 1CHR to 6CHR (shown as time widths C1 to C6 in FIG. 10) indicating six numerical data are arranged between the guide bar GB and the special center bar SCB.

Each of the character portions 1CHR to 6CHR is formed of two white bars 1W and two black bars 1B, and has a total module number of 7. In each of the character portions 1CHR to 6CHR, a predetermined numerical data is represented by combining the module number (corresponding to the time width T01) from left end of the left black bar 1B to the left end of the right black bar 1B with the module number (corresponding to the time width T02) from right end of the left black bar 1B to right end of the right black bar 1B.

The relationship between the combination of the two module numbers and predetermined numerical data, well known, are stored and held previously as a table (matrix) shown in FIG. 13. In FIG. 13, the letter E represents that the total module number of the black bars 1B is an even number and the letter O represents that the total module number of the black bars 1B is an odd numbers. For example, according to the UPC bar code structure shown in FIG. 10, the character portion 1CHR represents a numerical data of "ODD0(D0)(00)", the character portion 2CHR represents a numerical data of "ODD0(D0)(01)", and the character portion 6CHR represents a numerical data of "ODD2(D2)(02)".

Hence in order to extract and demodulate data of the bar code 1, the CPU 10 determines the module number of time widths ($\delta$ distance lengths) T01 and T02 for every character portion 1CHR to 6CHR in accordance with a bar width counted value stored in the memory 9, and reads the numerical data corresponding to the two combined module numbers stored previously in a predetermined table.

Conventionally, in order to execute the data extraction and the demodulation process of the bar code 1, the CPU 10 checks a bar width and judges whether the bar width counted value (or the time widths C1 to C6) of the bar code 1 read is within an allowable error range or not, and then executes a character demodulating process.

The scanning mechanism 4 irradiates a laser beam L2 of 1500 cycle/sec onto the bar code 1. Scanning the laser beam once across the bar code 1 can complete a demodulating process. However, conventionally, a so-called double coincidence checking method has been performed. According to this method, in order to prevent the bar code 1 from being read erroneously, after the demodulating process has been completed, the same process is repeated again. The reading operation is completed only when it is recognized that the same data as the previous one has been demodulated The above mentioned bar width checking, the character demodulating processing, and the double coincidence checking will be explained below in detail with reference to FIGS. 11 and 12. The CPU 10 performs a bar width checking, as shown in FIG. 11, when the bar width counted values of each black bar 1B and each white bar 1W are obtained by scanning the laser beam L2 once over the bar code (step 1).

The bar width checking obtains the time widths C1 to C6 of the character portions CHR1 to CHR 6, shown in FIG. 10, according to the bar width count value stored in the memory 9, and judges on whether the time widths C1 to C6 satisfy the following expressions (1) to (7) or not. The operational step can be advanced to the character demodulating process (step S2) only when all the conditions shown by the expressions (1) to (7) are satisfied. Even if any expressions (1) to (7) are not satisfied (NO), the next data processing (step S7) follows without performing the character demodulating process based on the bar width counted value currently obtained.

$$T1 \cdot 4.025 \geq C1 \geq T1 \cdot 2.975 \tag{1}$$

$$C1 \cdot 1.15 \geq C2 \geq C1 \cdot 0.085 \tag{2}$$

$$C2 \cdot 1.15 \geq C3 \geq C2 \cdot 0.85 \tag{3}$$

$$C3 \cdot 1.15 \geq C4 \geq C2 \cdot 0.85 \tag{4}$$

$$C4 \cdot 1.15 \geq C5 \geq C4 \cdot 0.85 \tag{5}$$

$$C5 \cdot 1.15 \geq C6 \geq C5 \cdot 0.85 \tag{6}$$

$$T26 \cdot 4.025 \geq C6 \geq T26 \cdot 2.975 \tag{7}$$

The time widths T1 and T26, shown in FIG. 10, are subjected to a bar width checking by another checking means before the bar checking shown in step S1 is performed. According to the expressions (1) and (7), it is checked whether the time widths C1 and C6 are within a predetermined range or not by using the time widths T1 and T26. According to the expressions (2) to (6), it is checked whether the ratios (character lengths) between the time widths C1 to C6 of adjacent character portions CHR1 to CHR6, or C2/C1, C3/C2, C4/C3,/C5/C4, and C6/C5, are within a range of 0.85 to 1.15 (or within an error range of $\pm 15\%$) or not. Unless all conditions are satisfied, it is judged that the reading error of the bar code 1 is large. Hence according to the step S7, the following scanning data (or bar width counted value) is processed without performing the character demodulating process.

In the character demodulating process in the step S2, two numerical data determining time widths ($\delta$ distance values) T01 and T02 are calculated every character portion (1CHR to 6CHR) based on the bar width counted value stored in the memory 9. Then, according to the procedure shown in FIG. 12, it is judged which module numbers of 2 to 5 correspond respectively to the two time widths T01 and T02. The two module numbers obtained through the judgment are identified with the previously stored table to read the numerical data corresponding to a combination of two module numbers, whereby each of the character portions 1CHR to 6CHR is demodulated and the data of the bar code 1 are extracted and demodulated.

A module number judging process applied to the two time widths T01 and T02 in the character portion 1CHR will be explained with reference to FIG. 12. First, it is judged whether the time width T01 (or T02) is 0.643 or more times the time width C1 of the character portion 1CHR (step S11). C1·0.643 corresponds to the time width (counted value) of 4.5 module. In the module number judging process, when the time width T01 (or T02) is more than 4.5 module numbers, it is judged that the module number is 5 (step S12). In the similar manner, when the module number is 3.5 or more but less than 4.5, it is judged that the module number is 4 (steps S13 and S14). When the module number 2.5 or more but less than 3.5, it is judged that the module number is 3 (step S15 and S16). When the module number is 1.5 or more but less than 2.5, it is judged that the module number is 2 (step S17).

FIG. 12 shows a module number judging process procedure for the character portion 1CHR. When the other character portions 2CHR to 6CHR are subjected to a module number judging process, the time width C1 in the steps S11, S13, and S15 may be changed to the time widths C2 to C6.

In the step S2, after the data of the bar code 1 is extracted and demodulated, it is judged whether the previous demodulation data exists in the same bar code or not (step S3). If the previous data is not found, the demodulation data extracted in the step S2 is stored in the memory (step S4). When it is judged that the previous demodulation data exists in the step S2, it is read out. It is judged whether the previous data is identified with the currently extracted demodulation data or not (step S5). If no identification is found, since it is judged that the demodulation data is invalid, the next data process (step S7) is performed. On the other hand, if the previous data is identified with the current data, since the demodulation data is valid, the data reading to the bar code 1 is completed (step S6).

With reference to FIG. 10, an explanation has been made for the reading operation of the bar code 1 where six character portions 1CHR to 6CHR are arranged between the guide bar GB and the special center bar SCB. There are bar codes of various types. For example, as for the bar code 1 shown in FIG. 10, the special center bar SCB on the right side of the bar code 1 may be a center bar formed of two black bars 1B of module number 1 and two white bars 1W of module number 2, and character portions arranged on the right and left sides with respect to the center bar. Any type of bar code can be basically performed by conducting a bar code reading according to the above procedure.

In recent years, bar codes have been typically utilized in the POS systems in the distribution industry. Poor bar codes with low print quality tend to be used increasingly, thus resulting in potential for erroneous reading. Therefore it has been desired that even the bar codes in poor print quality can be read at higher accuracy and without causing an erroneous reading operation. Additionally erroneous reading of the bar code occurs because of a curvature or wrinkles of a bar code, flaws on the reading window glass of the bar code reader or other types.

In order to avoid such an erroneous reading, as described with reference to FIG. 11, demodulating at least twice and a double coincidence checking operation are performed. When the height and figure of a bar code and the scanning rate of the laser beam L2 allow only a single bar code scanning operation, the double coincidence checking method may judge that a bar code reading cannot be performed (as NO) even if the first demodulation data is reliable.

SUMMARY OF THE INVENTION

The present invention is made to overcome the above mentioned problems. An object of the present invention is to provide a bar Code reading method wherein the reliability of demodulated data is evaluated quantitatively, and a coincidence checking is performed plural times only when it is judged that an error is large, whereby an improved reading ratio or a reduced erroneous reading ratio can be established practically.

Another object of the present invention is to provide a bar code reader wherein the reliability of demodulated data is evaluated quantitatively, and a coincidence checking is performed plural times only when it is judged that an error is large, whereby an improved reading ratio or a reduced erroneous reading ratio can be established practically.

In order to achieve the first object of the present invention, a bar code reading method wherein a beam light is irradiated and scanned to a bar code and data of the bar code is extracted and demodulated based on the light amount of a reflection light of the beam light, is characterized by the steps of measuring a reading distortion amount of the bar code; judging data extracted and demodulated from the bar code as valid data when the reading distortion amount measured is within a predetermined allowance range, whereby the bar code reading is completed; and judging data extracted and demodulated from the bar code as valid data if the same data from the bar code is extracted and demodulated continuously and at least twice when the reading distortion amount measured is not within the predetermined allowance range, whereby the bar code reading is completed.

According to the present invention, the bar code reading distortion amount is a character length ratio between adjacent characters which are obtained by calculating and measuring based on the character lengths of plural characters forming the bar code.

According to the present invention, the bar code reading distortion amount is a $\delta$ distance length to a module number conversion accuracy calculated and measured when the $\delta$ distance length is converted into a module number to extract and demodulate data of the bar code, the $\delta$ distance length being obtained for every character to specify data of plural characters forming the bar code, the module number counting one module as a predetermined criterion length.

Furthermore, according to the present invention, the bar code reading distortion amounts are a character length ratio between adjacent characters and a $\delta$ distance length to a module number conversion accuracy calculated and measured when the $\delta$ distance length is converted into a module number to extract and demodulate data of the bar code; the character length ratio being obtained by calculating and measuring based on the characteristic length of plural characters; the $\delta$ distance length being obtained for every character to specify data of plural characters forming the bar code; the module number counting one module as a predetermined criterion length.

A bar code reading method according of the present invention is characterized in that the $\delta$ distance length to module number conversion accuracy is calculated as an error to said predetermined criterion length of a value obtained by dividing the $\delta$ distance length by the module number.

A bar code reading method according to the present invention is characterized in that the predetermined criterion length is calculated as a value obtained by dividing a character length of the character by the module number of the character.

A bar code reader is characterized by a light source for emitting a beam light; scanning means for scanning the beam light from the light source to irradiate to a bar code; photoelectric converting means for receiving a reflection light of the beam light from the bar code to convert it into an electric signal corresponding to the light amount thereof; and demodulating means for extracting and demodulating data of the bar code based on the electric signal from the photoelectric converting means; the demodulating means including distortion amount measuring means for calculating and measuring the reading distortion amount of the bar code; and judging means for judging whether the reading distortion amount calculated and measured by the distortion amount measuring means is within a predetermined allowable range or not; whereby the demodulating means judges that the data extracted and demodulated from said bar code is valid when said judging means judges that the reading distortion amount is within the allowable range, and then completes the bar code reading operation; whereby the demodulating means judges that the data extracted and demodulated from the bar code is valid only when the same data of the bar code can be extracted and demodulated continuously and at least twice when the judging means judges that the reading distortion amount is not within the allowable range, and then completes the bar code reading operation.

According to the present invention, the distortion amount measuring means is characterized by length measuring means for measuring the character lengths of plural characters forming the bar code; and character length ratio calculating means for calculating a character length ratio between adjacent characters as the bar code reading distortion amount based on the character length of each character measured by the length measuring means.

A bar code reader according to the present invention is characterized in that the distortion amount measuring means is formed of a converting accuracy calculating means for calculating a δ distance length to a module number converting accuracy as the bar code reading distortion amount when the δ distance length is converted into a module number to extract and demodulate data of said bar code, the δ distance length being obtained every character to specify data of plural characters forming the bar code, the module number counting one module as a predetermined criterion length.

According to the present invention, the distortion amount measuring means is characterized by length measuring means for measuring the character lengths of plural characters forming the bar code; character length ratio calculating means for calculating as a reading distortion amount of the bar code a character length ratio between adjacent characters based on the character length of each character measured by the length measuring means; and a conversion accuracy calculating means for calculating a δ distance length to module number converting accuracy as the bar code reading distortion amount when the δ distance length is converted into a module number to extract and demodulate data of the bar code. Then δ distance length is obtained for every character to specify data of plural characters forming the bar code. The module number counts one module as a predetermined criterion length.

Furthermore according to the present invention, the conversion accuracy calculating means is characterized by dividing means for dividing the δ distance length by the module number; and error calculating means for calculating an error to the predetermined criterion length of a divided value from the dividing means as the conversion accuracy.

A bar code reader according to the present invention further includes criterion length calculating means for calculating the predetermined criterion length as a value that the character length of the character is divided by a module number of the character.

A bar code reader according to the present invention further includes varying means for varying the predetermined allowable range of the judging means to a set value.

Therefore, according to the bar code reading method and the bar code reader of the present invention, when the reading distortion amount of a bar code is measured to be within a predetermined allowable range, it is judged that data extracted and demodulated from the bar code is valid, whereby the reading of the bar code is completed. If the reading distortion amount measured is not within the predetermined allowable range, it is judged that data extracted and demodulated from the bar code is valid only when the same data from the bar code is extracted and demodulated continuously and at least twice, whereby the reading of the bar code is completed. An error of the bar code width (reading distortion amount) occurs due to the print quality, curvature, wrinkles of the bar code, and flaws on glass of the reading window surface of a bar code reader. The error of the bar code is evaluated quantitatively as a character length ratio, to evaluate the reliability of demodulated data. A coincidence checking is repeated plural times only when it is judged that the error is large so that the reading ratio in practical use can be effectively improved remarkably to reduce the erroneous reading ratio.

BRIEF DESCRIPTION OF THE DRAWINGS

FIG. 13 is a table showing the relationship between a combined module number and numerical data.

DESCRIPTION OF THE PREFERRED EMBODIMENTS

Referring to the attached drawings, an explanation will be made in detail as for preferred embodiments of the bar code reading method and the bar code reader according to the present invention.

(a) Explanation of the Principle of the Present Invention

Figure 1:
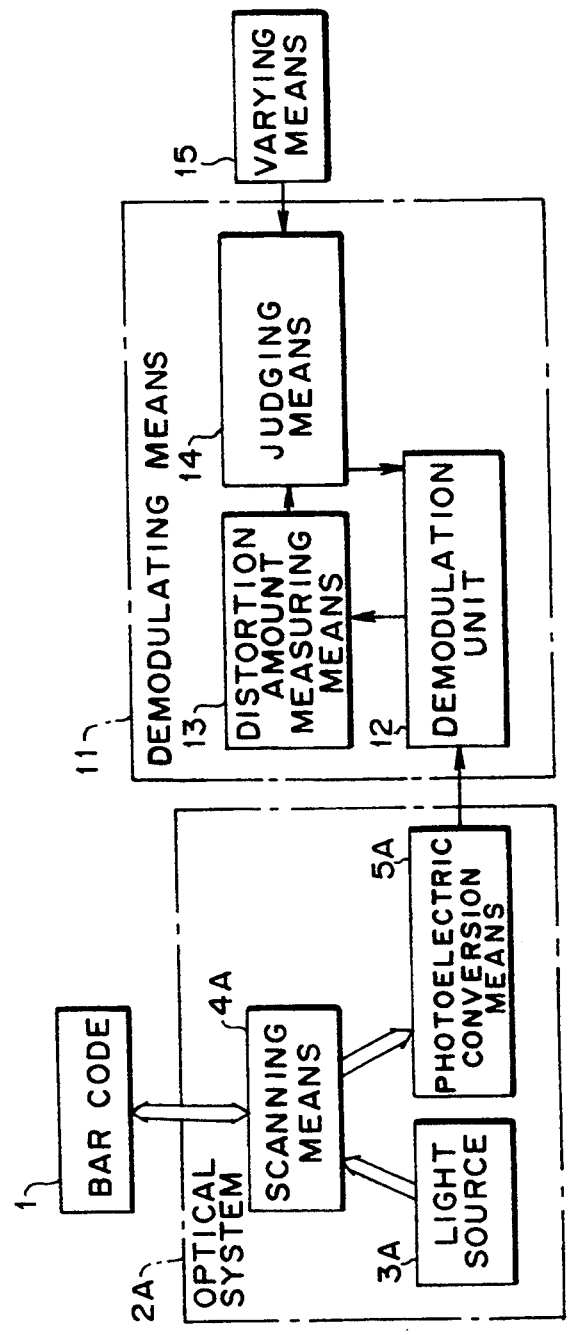
FIG. 1 is a block diagram showing the principle of the present invention.

FIG. 1 is a block diagram showing the principle of the present invention. Referring to FIG. 1, numeral 1 represents a bar code, 2A represents an optical system which irradiates a beam light to the bar code 1 and receives the beam light reflected back from the bar code 1, 3A represents a light source for emitting a beam light, 4A represents scanning means for scanning the beam light from the light source 3A on the bar code 1, and 5A represents photoelectric converting means for receiving the beam light reflected back from the bar code 1 and for converting into an electric signal corresponding to the light amount thereof. The optical system 2A is formed of a light source 3A, scanning means 4A, and photoelectric converting means 5A.

Numeral 11 represents demodulating means including a demodulation unit 12 for extracting and demodulating data of the bar code 1 based on an electric signal from the photoelectric converting means 5A. The demodulating means 11 includes a distortion amount measuring means 13 for extracting and calculating the reading distortion amount of the bar code 1, judging means 14 for judging whether the reading distortion amount measured by the distortion amount measuring means 13 is within the predetermined allowable range or not, and varying means 15 for varying the predetermined allowable range of the judging means 14 to a set value.

According to the present invention, when the judging means 14 judges that the reading distortion amount is within a predetermined allowable range, since data extracted and demodulated from the bar code is valid, the demodulating means 11 completes the reading operation of the bar code 1. When the judging means 14 judges that the reading distortion amount is not within a predetermined allowable range, the data extracted and demodulated from the bar code 1 is judged as a valid only when the same data from the bar code 1 is extracted and demodulated continuously and at least twice, whereby the reading operation of the bar code 1 is completed.

The distortion amount measuring means 13 may be formed of length measuring means for measuring the character lengths (refer to C1 to C6 in FIG. 10) of plural characters (refer to CHR 1 to CHR 6 in FIG. 10) forming the bar code 1, and character length ratio calculating means for calculating as a reading distortion amount of the bar code 1 the character length ratios between adjacent characters based on the character length of each character measured by the length measuring means.

A conversion accuracy calculating means may be used as the distortion amount measuring means 13. The conversion accuracy calculating means 13 calculates the conversion accuracy of a δ distance length (refer to T01 and T02 in FIG. 10) as a reading distortion amount of the bar code 1 when the δ distance length is converted into a module number to extract and demodulate data of the bar code 1. The δ distance length is obtained every character to specify plural character data of the bar code 1. The module number is obtained by counting one module as a predetermined criterion length.

Furthermore, the distortion amount measuring means 13 may be a combination of the length measuring means, the character length calculating means, and the conversion accuracy calculating means.

The conversion accuracy calculating means forming the distortion amount measuring means 13 may be constituted of dividing means for dividing the δ distance length by the module number, and error calculating means for calculating as a conversion accuracy an error to a predetermined criterion length of the divided value from the dividing means. The criterion length calculating means may include criterion length calculating means for calculating a predetermined criterion length used for the error calculating means as a value obtained by dividing the character length of a character by a module number thereof.

In the above structure according to the present invention, as shown in FIG. 1, the scanning means 4A irradiates the beam light emitted from the light source 3A onto the bar code 1 while it moves and scans at a fixed rate. The beam light is irradiated as a light reflected and scattered at a portion of the bar code 1 to the photoelectric converting means 5A. The reflection light is converted into an electric signal corresponding to the light amount thereof. The demodulation unit 12 in the demodulating means 11 extracts and demodulates a predetermined data of the bar code 1 based on the electric signal.

According to the present invention, in the demodulating means 11, the distortion amount measuring means 13 calculates and demodulates the reading distortion amount of the bar code 1 when data of the bar code 1 is extracted and demodulated. The judging means 14 judges whether the measured reading distortion amount is within a predetermined allowable range or not. The predetermined allowable range can be varied to a different set value by the varying means 15.

When the judging means 14 judges that the reading distortion amount from the distortion amount measuring means 13 is within a predetermined allowable range, since the data extracted and demodulated from the bar code 1 is valid, the demodulation unit 12 completes the reading operation of the bar code 1.

If the judging means 14 judges that the reading distortion amount from the distortion amount measuring means 13 is not within a predetermined allowable range, the same data from the bar code 1 is subjected continuously and at least twice to an extraction and demodulation. Thus, the demodulation unit 12 judges that the data extracted and demodulated is valid and completes the reading operation of the bar code 1.

In the prior art, the double coincidence checking is usually performed. According to the present invention, it is judged whether the bar code data read is within a predetermined allowable range or not and a coincidence checking is performed continuously and at least twice (conventionally called a double coincidence checking) only when there is a distortion over the predetermined allowable value including a high probability of an erroneous reading. Therefore, according to the present invention when the distortion is within the predetermined allowable range, a single checking operation can complete the reading operation of the bar code 1.

In this case, when the distortion amount measuring means 13 measures the reading distortion amount of the bar code 1, the character length ratio calculating means may calculate the character length between adjacent characters to use it as a reading distortion amount. A value obtained by calculating the conversion accuracy to the module number of the δ distance length by the conversion accuracy calculating means when the δ distance length is converted into a module number to extract and demodulate data of the bar code 1 may be used as a reading distortion level. The δ distance length is obtained for every character specifying data forming the bar code 1. The module number is obtained by counting one module as a predetermined criterion length. Furthermore, both two amounts of data, or the character length ratio between adjacent characters and the conversion accuracy to the module number of the δ distance length may be calculated to use as a reading distortion amount.

When the conversion accuracy calculating means calculates a conversion accuracy, the dividing means divides the δ distance length by a module number. The error calculating means calculates as a conversion accuracy the error to a predetermined criterion length of a divided value from the dividing means. The predetermined criterion length used for the error calculating means is calculated by dividing the character length of a character by the module number thereof by using the criterion length calculating means.

Therefore, according to the bar code reading method and the bar code reader of the present invention, when the bar code reading distortion amount is measured within a predetermined allowable range, it is judged that data extracted and demodulated from the bar code is valid, whereby the bar code reading operation is completed. If the reading distortion amount is measured over the predetermined allowable range, it is judged that data extracted and demodulated from the bar code is valid only when the data of the bar code is extracted and demodulated continuously and at least twice, whereby the bar code reading is completed. The above structure can evaluate quantitatively an error (reading distortion amount) in bar code width which occurs due to print quality, curvature, wrinkles of a bar code, and flaws on the reading window glass in a bar code reader as a character length ratio and can evaluate the reliability of demodulated data. Since the coincidence checking is performed a plural number of times only when it is judged that an error is large, there is an advantage that a large reading ratio in practical use can be realized or an erroneous reading ratio can be reduced.

(b) Explanation of the First Embodiment

Figure 2:
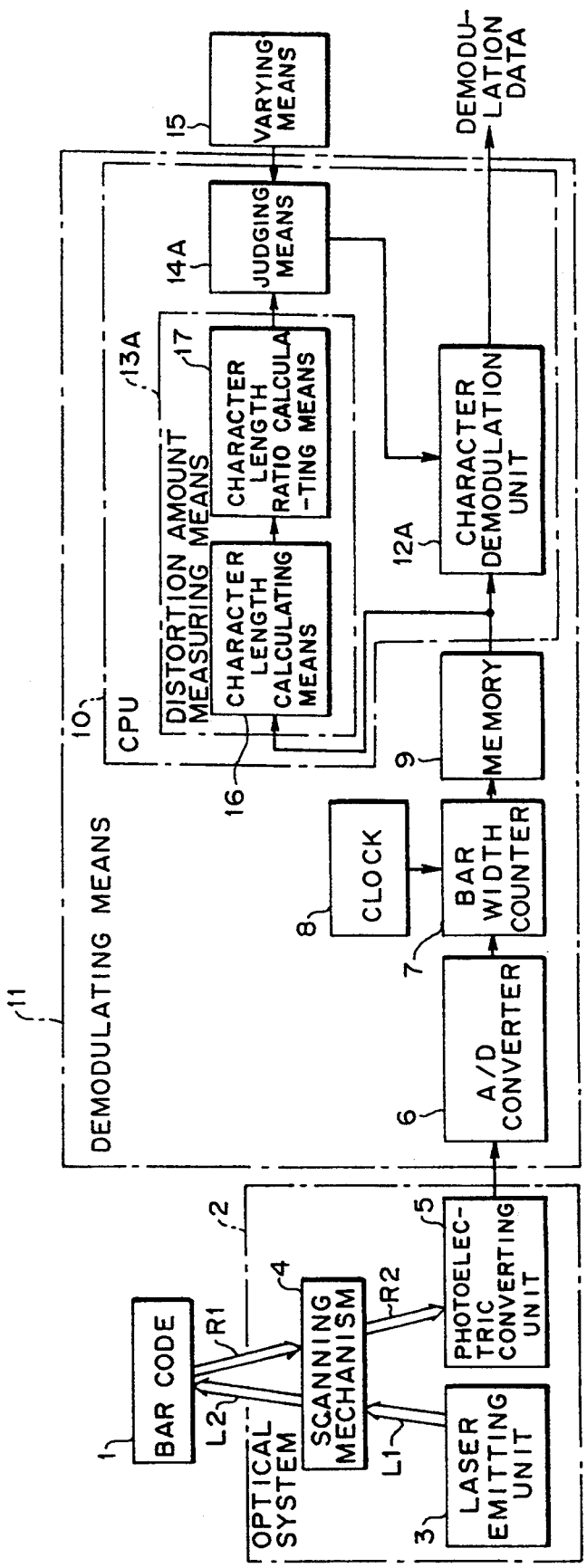
FIG. 2 is a block diagram showing the first embodiment of the present invention.

An explanation will be made below for the first embodiment of the present invention with reference to the attached drawings. FIG. 2 is a block diagram showing the first embodiment according to the present invention. As shown in FIG. 2, the method and device of the present embodiment extract and demodulate data of a bar code 1 printed on a surface of an article.

Figure 10:
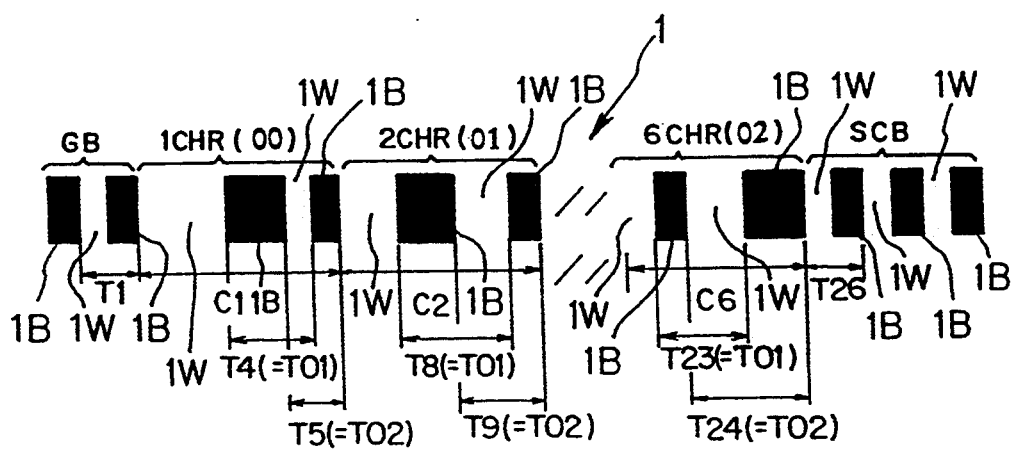
FIG. 10 is a diagram showing a layout of a bar code.

The bar code 1, as described with FIG. 10, is formed of plural black bars 1B and plural white bars 1W arranged alternatively. The widths of each black bar 1B and each white 1W indicate predetermined data. The character portions 1CHR to 6CHR (portions shown with the character lengths or time widths C1 to C6) representing six numerical data are arranged between the guide bars GB and special center bar SCB defining both ends of the bar code 1.

Each of the character portions 1CHR to 6CHR is formed of, for example, two white bars 1W and two black bars 1B, or a total module number of 7. As described with reference to FIG. 10, a predetermined numerical data of each of character portions 1CHR to 6CHR is represented by combining a module number corresponding to the time width (δ distance value) T01 from the left end of the left black bar 1B to the left end of the right black bar 1B with a module number (δ distance value) T02 corresponding to the time width from the right end of the left black bar 1B to the right end of the right bar 1B. The relationship between a combined module number and a predetermined numerical data is well known and stored and held as a predetermined table (matrix).

In a similar manner to the conventional art, the optical system 2 is formed of a laser emitting unit (light source) 3, a scanning mechanism (scanning means) 4, and a photoelectric converting unit (photoelectric converting means 5. The laser light emitting unit 3 includes a semiconductor laser for emitting a laser beam L1. The scanning mechanism 4 is formed of a polygon mirror driven rotatably by, for example, a motor. The photoelectric converting unit 5, for example, includes a photoelectric converting element such as a photo diode. Since the laser emitting unit 3, the scanning mechanism 4, and the photoelectric converting unit 5 have similar functions to those of the prior art, the detail explanation of which will be omitted.

Furthermore, the rear stage of the photoelectric converting unit 5 has a similar structure to that in the conventional demodulating means 11 including an A/D converter 6, a bar width counter 7, a clock generator 8, a memory 9, and a CPU 10.

Like the prior art structure, the A/D converter 6 converts an electric signal from the photoelectric converting unit 5 into a binary signal in a digital form including a black level signal (low level signal) corresponding to each black bar portion 1B forming the bar code 1 and a white level signal (high level signal) corresponding to each white bar portion 1W forming the bar code 1.

The bar width counter 7 counts clock signals from the clock generator 8. The bar width counter 7 also outputs as a clock signal counted value the time widths corresponding to the black level signal portion and the white level signal portion of a binary signal from the A/D converter 6, or a value corresponding to the widths of each black bar 1B and each white bar 1W of an actual bar code 1. The memory 9 stores the bar width counted value from the bar width counter 7.

The CPU 10 according to the present invention extracts and demodulates predetermined data of the bar code 1 based on the bar width counted values (values corresponding to the widths of each black bar 1B and each white bar 1W) stored in the memory 9. The CPU 10 according to the present invention, as shown in FIG. 2, is constituted of a character demodulation unit 12A, a distortion amount measuring means 13A, and a judging means 14A.

The character demodulation unit 12A determines the module numbers of the time widths T01 and T02 of each of the character portions 1CHR and 6CHR based on the bar width counted value stored in the memory 9, and reads the numerical data from the previously stored predetermined table, whereby the data of the bar code 1 is extracted and demodulated. The numerical data corresponds to two module numbers combined.

The distortion amount measuring means 13A calculates and measures a reading distortion amount of a bar code 1. According to the present embodiment, the distortion amount measuring means 13A is formed of character length calculating means (length measuring means) 16 and character length ratio calculating means 17. The character length calculating means 16 calculates and measures the character length (time width) C1 to C6 of the character portions CHR1 to CHR6 defining a bar code 1 based on a bar width counted value from the memory 9. The character length ratio calculating means 17 calculates as a reading distortion amount of a bar code respective character length ratios C2/C1, C3/C2, C4/C3, C5/C4, and C6/C5 between adjacent character portions CHR1 to CHR6, based on character lengths C1 to C6 from the character length calculating means 16.

The judging means 14A judges whether a reading distortion amount (character length ratio in this present embodiment) from the distortion amount measuring means 13A is within a predetermined allowable range or not. The judging means 14A also executes a first bar character width checking (to be explained later with the step S21 in FIG. 3) where it is conventionally judged whether an error is within ±15% or not in accordance with the expressions (1) to (7), and a second bar character width checking (to be explained later with the step S23 in FIG. 3) where it is judged whether an error is within ±15% (a predetermined allowable range) or not in accordance with the expressions (8) to (14).

When the judging means 14A judges that respective character length ratios are satisfactory for the conditions of the expressions (8) to (14) and the character length ratios are within an allowable error range in the second bar width checking, since data extracted and demodulated from the bar code 1 is valid, the character demodulation unit 12A according to the present embodiment completes the reading of the bar code 1. When the judging means 14A judges that at least one of the conditions of the expressions (8) to (14) is not satisfactory and at least one of the character length ratios is not within an allowable error range in the second bar width checking (data) extracted and demodulated from the bar code 1 is valid only when the same data from the bar code 1 can be extracted continuously and twice as described later with FIG. 3 whereby the reading of the bar code 1 is completed.

Varying means 15 which can variably set the predetermined allowable range (error range) in the judging means 14A are connected to the CPU 10.

In the above structure, the scanning mechanism 4 irradiates the laser beam L1 emitted from the laser emitting unit 3 as a laser beam L2 onto the black bar 1B and the white bar 1W of a bar code 1. The scanning mechanism 4 moves at a fixed rate while it scans perpendicularly to the black bar 1B and the white bar 1W of the bar code 1.

The laser beam L2 emitted from the scanning mechanism 4 is reentered as a reflection light R1 scattered and reflected back at a portion of the bar code 1 to the scanning mechanism 4. The reflection light R1 travels with the reflection angle changed with the scanning movement of the laser beam L2. The reflection light R1 is reflected with the polygon mirror forming the scanning mechanism 4 to enter as a reflection light to the photoelectric converting element of the photoelectric converting unit 5.

The photoelectric conversion unit 5 converts the reflection light R2 into an electric signal corresponding to the light amount thereof. The A/D converter 6 converts the electric signal into a binary signal in a digital form including a black level signal corresponding to each black bar 1B of the bar code 1 and a white level signal corresponding to each white bar 1W of the bar code 1.

Then the bar width counter 7 counts clock signals from the clock generator 8. The time widths (values corresponding to each black bar 1B and each white bar 1W of an actual bar code 1) of the black level signal portion and the white level signal portion of a binary signal from the A/D converter 6 are measured as a counted value of a clock signal which is stored once in the memory 9.

The character demodulation unit 12A in the CPU 10 determines the module number of the time widths ($\delta$ distance value) T01 and T02 of each of the character portions 1CHR to 6CHR based on the bar width counted value stored in the memory 9, and reads numerical data from a previously stored predetermined table to extract and demodulate the data of the bar code 1.

Figure 3:
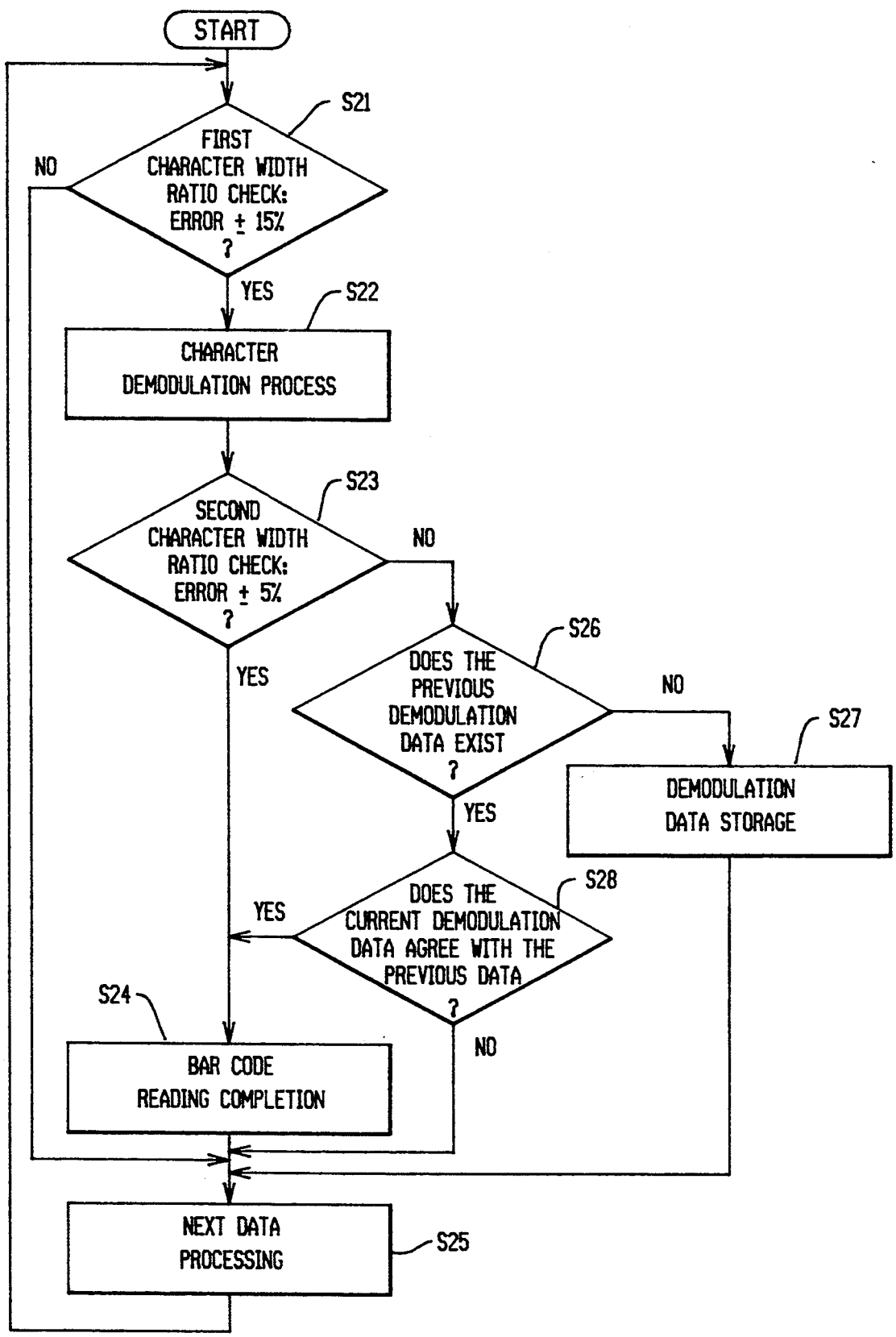
FIG. 3 is a flowchart for explaining the operation according to the first embodiment of the present invention.

Next an explanation will be made below in detail for the operation of the first .embodiment with reference to FIG. 3. The CPU 10 scans once the bar code 1 using a laser beam L2. When the bar width counted values of each black bar 1B and each white bar 1W of the bar code 1 is obtained, the distortion amount measuring means 13A and the judging means 14A perform the first bar character width checking (step S21), in a similar manner to the conventional bar character width checking explained in the step S1 in FIG. 11.

In the first bar width checking, the character length calculating means 16, in the distortion amount measuring means 13A, calculates the character lengths C1 to C6 of the character portions CHR1 to CHR6 based on the bar width counted value stored in the memory 9. Then the character length ratio calculating means 17 calculates the character length ratios C2/C1, C3/C2, C4/C3, C5/C4, and C6/C5 between the adjacent character portions CHR1 to CHR6 based on the character lengths C1 to C6.

It is judged whether each character length ratio satisfies the conditions (error range of less than +-15%) of the expressions (1) to (7) or not. When all the conditions of the expressions (1) to (7) are satisfied (OK), the character demodulation process (step S22) is performed. When any one of the expressions (1) to (7) is not satisfied, it is judged that the reading error of the bar code 1 is large. Thus, the following process (step S25) is performed without performing the character demodulating process in accordance with the current bar width counted value.

Figure 12:
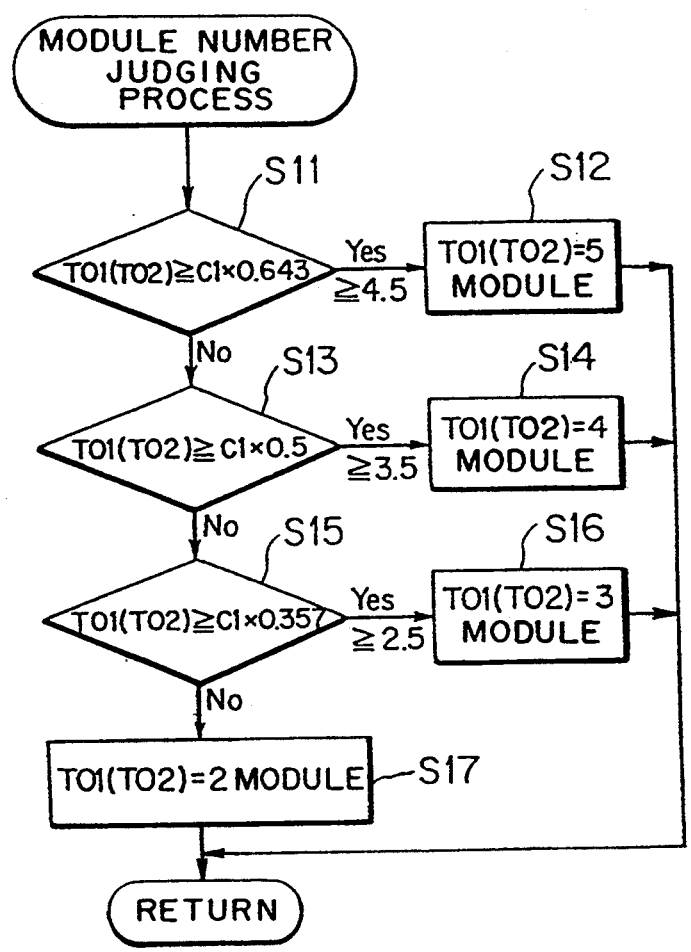
FIG. 12 is a flowchart for explaining a module number judging processing procedure.

In the character demodulation process in the step S22, the character demodulation unit 12A calculates two time widths T01 and T02 determining numerical data for each of the character portions 1CHR and 6CHR, based on the bar width counted value stored in the memory 9; judges to what module numbers 2 to 5 the two time widths T01 and T02 correspond respectively, in accordance with the procedure shown in FIG. 12; identifies the two module number obtained through the above judgment with the previously stored table; reads numerical data corresponding to a combination of two module numbers; and finally demodulates the character portions 1CHR to 6CHR or extracts and demodulates data of the bar code 1.

Furthermore, according to the present embodiment, after the character demodulation process is performed in step S22, the distortion amount measuring means 13A and the judging means 14A perform the second bar width checking (step S23)

In the second bar width checking, the judging means 14A judges whether the character length ratios C2/C1, C3/C2, C4/C3, C5/C4, and C6/C5, which are calculated by the character length calculating means 16 and the character length ratio calculating means 17 in the distortion amount measuring means 13A, satisfy the conditions (an error range within ±5%) of the expressions (8) to (14). When all the conditions of the expressions (8) to (14) are satisfied (OK), since the reading accuracy of the bar code 1 is high, it is judged that an error will not occur in the demodulation data even if the conventional double coincidence checking is not executed. Hence it is judged immediately that data of the bar code 1 once extracted and demodulated is valid so that the reading of the bar code 1 is completed.

$$T1\cdot3.675 \geq C1 \geq T1\cdot3.325 \quad (8)$$

$$C1\cdot1.05 \geq C2 \geq C1\cdot0.95 \quad (9)$$

$$C2\cdot1.05 \geq C3 \geq C2\cdot0.95 \quad (10)$$

$$C3\cdot1.05 \geq C4 \geq C3\cdot0.95 \quad (11)$$

$$C4\cdot1.05 \geq C5 \geq C4\cdot0.95 \quad (12)$$

$$C5\cdot1.05 \geq C6 \geq C5\cdot0.95 \quad (13)$$

$$T26\cdot3.675 \geq C6 \geq T26\cdot3.325 \quad (14)$$

If the judging means 14A judges that any one of the expressions (8) to (14) is satisfied (NG in FIG. 3), the reading error of the bar code 1 is not within the range where it can be judged that the demodulation data erroneous reading has not occur at all. In this case, the process is directed to the conventional double coincidence checking (steps S26 to S28).

Figure 11:
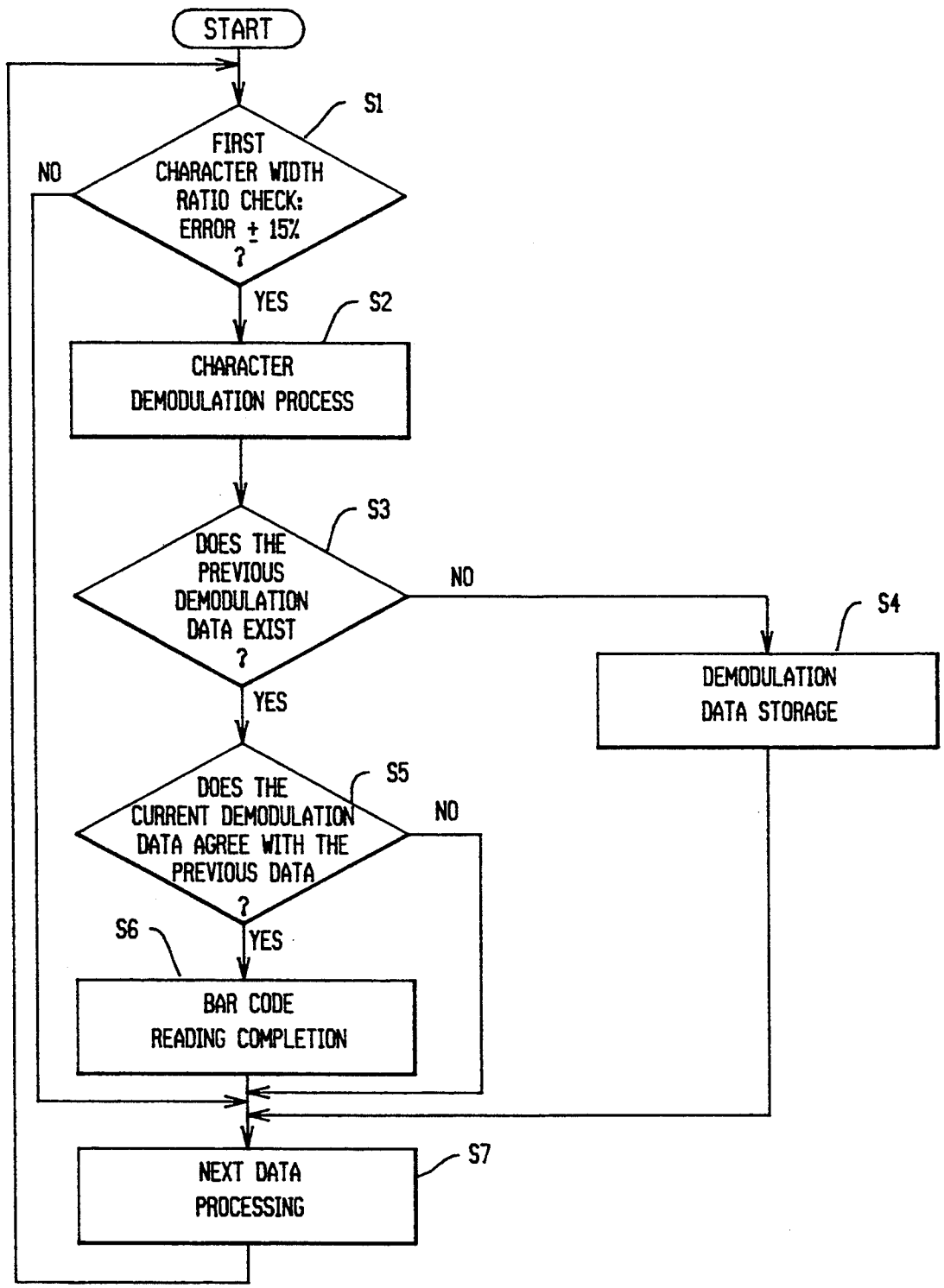
FIG. 11 is a flowchart for explaining a bar code reading procedure.

That is, in a similar manner to the steps S3 to S5 shown in FIG. 11, it is judged whether there is previous demodulation data regarding the same bar code 1 as that subjected to the character demodulation process in the step S22 or not (step S26). If not found, the demodulation data extracted in the step S22 is stored in the memory (step S27).

When it is judged that the previous demodulation data is found in the step S26, it is read out. Then it is judged whether the previous data agrees with the currently extracted demodulation data or not (step S28).

In the case of no agreement, the following data processing is performed since the demodulation data is invalid. On the other hand, when the previous demodulation agrees with the current demodulation data, since the demodulation data is valid, the data reading of the bar code 1 is completed (step S24).

According to the present embodiment, the judging means 14 A sets the allowable error range to two kinds of ranges of ±15% and ±5%. However, the allowable error range can be varied with varying means 15 such as a DIP switch, a bar code setting, and commands from an interface. Hence a user can vary arbitrarily the allowable error range (in the case where an increase in erroneous reading ratio is a significant factor).

According to the first embodiment of the present invention, an error in an bar code width, which occurs due to print quality, curvature and wrinkles of the bar code 1, and flaws on the reading window glass of the bar code reader (optical system 2), is evaluated quantitatively as a character length ratio, and the reliability of the demodulated data is evaluated. Furthermore, a correspondence checking is performed plural times (twice in this embodiment) only when it is judged that the error is large. Hence since the reading ratio is increased largely in practical use, the erroneous reading ratio can be decreased largely.

Frequently, a bar code may be scanned only once because of the height and figure of a bar code 1 and the scanning rate of the laser beam L2. In this case, according to the first embodiment, if the demodulation data obtained first is reliable, the reading of the bar code 1 can be performed without performing the double coincidence checking method, whereby the reading ratio can be improved in practical use.

(c) Explanation of the Second Embodiment

Figure 4:
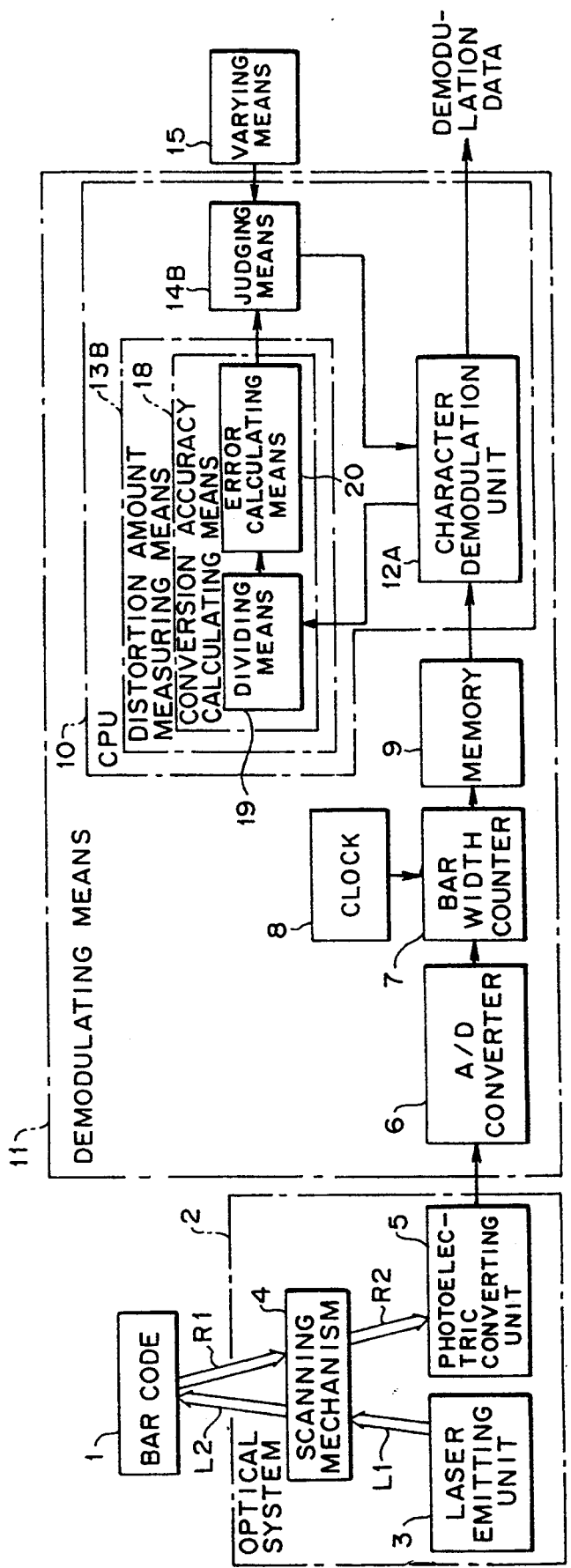
FIG. 4 is a block diagram showing the second embodiment of the present invention.

FIG. 4 is a block diagram showing the second embodiment of the present invention. Referring to FIG. 4, the device of the present embodiment is substantially similar to that of the first embodiment shown in FIG. 2. The second embodiment is different from the first embodiment in the structure of the distortion amount measuring means 13B in the CPU 10 and the judging criterion of the judging means 14B. In FIG. 4, since like symbols and numerals represents like portions, the explanation will be omitted.

The distortion amount measuring means 13B includes conversion accuracy calculating means 18 which calculates the conversion accuracy to the module numbers of the distance lengths T01 and T02 as a reading distortion amount of the bar code 1 when the character demodulation unit 12A converts the $\delta$ distortion amounts T01 and T02 into a module number and extracts and demodulates data of the bar code 1, where the $\delta$ distortion amount is obtained for each of the character portions 1CHR and 6CHR specifying data of the character portions 1CHR to 6CHR forming the bar code 1 and the module number is obtained by counting a predetermined criterion length as one module.

Figure 6:
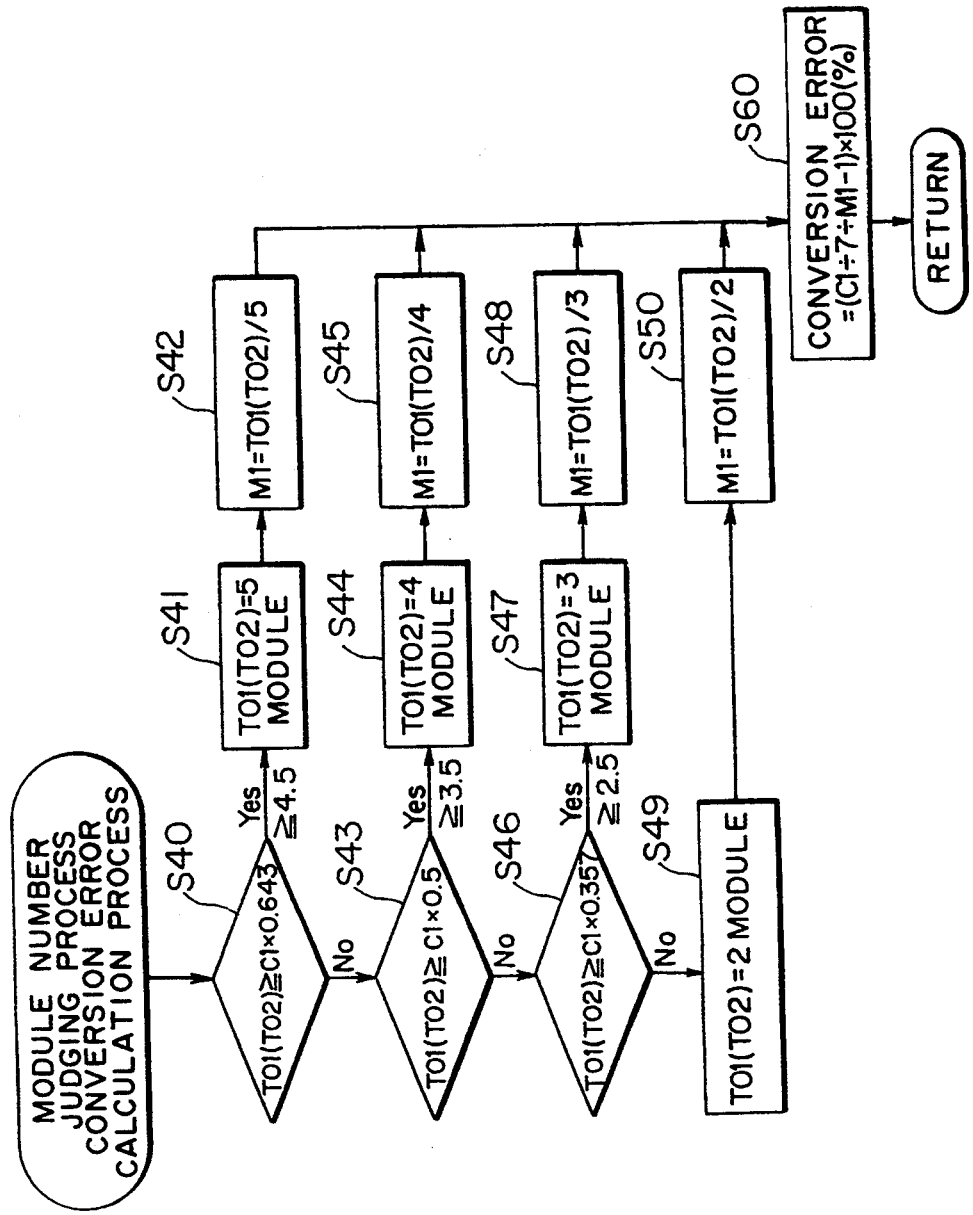
FIG. 6 is a flowchart for explaining the module number judging processing procedure and the conversion error calculating processing procedure according to the second embodiment of the present invention.

The conversion accuracy calculating means 18, as described later with FIG. 6, is constituted of dividing means 19 for dividing the $\delta$ distortion amounts T01 and T02 by the module number, and error calculating means 20 for calculating as a conversion accuracy (conversion error) an error with respect to a predetermined criterion length of a divided value (a counted value corresponding to one module length) from the dividing means 19. The error calculating means 20 according to the present embodiment includes criterion length calculating means (not shown) for dividing the character length C1 (~C6) of a predetermined character portion to calculate a predetermined criterion length (or for calculating C1+7 in the step S60, as described later).

The judging means 14B judges whether the reading distortion amount (conversion error in this embodiment) obtained from the distortion amount measuring means 13B is within a predetermined allowable range (5% in this embodiment) or not.

When the judging means 14B judges that the conversion accuracy error is within 5%, since the data extracted and demodulated from the bar code 1 is valid, the character demodulation unit 12A according to the present embodiment completes the reading of the bar code 1. If the judging means 14B judges that conversion error is over 5%, since data extracted and demodulated from the bar code 1 is valid only when the same data 1 from the bar code 1 is extracted and demodulated continuously twice, as described later in FIG. 5, the reading of the bar code 1 is completed.

Like the first embodiment, varying means 15, which can set variably the predetermined allowable range (error range) of the judging means 14B, are connected to the CPU 10.

Figure 5:
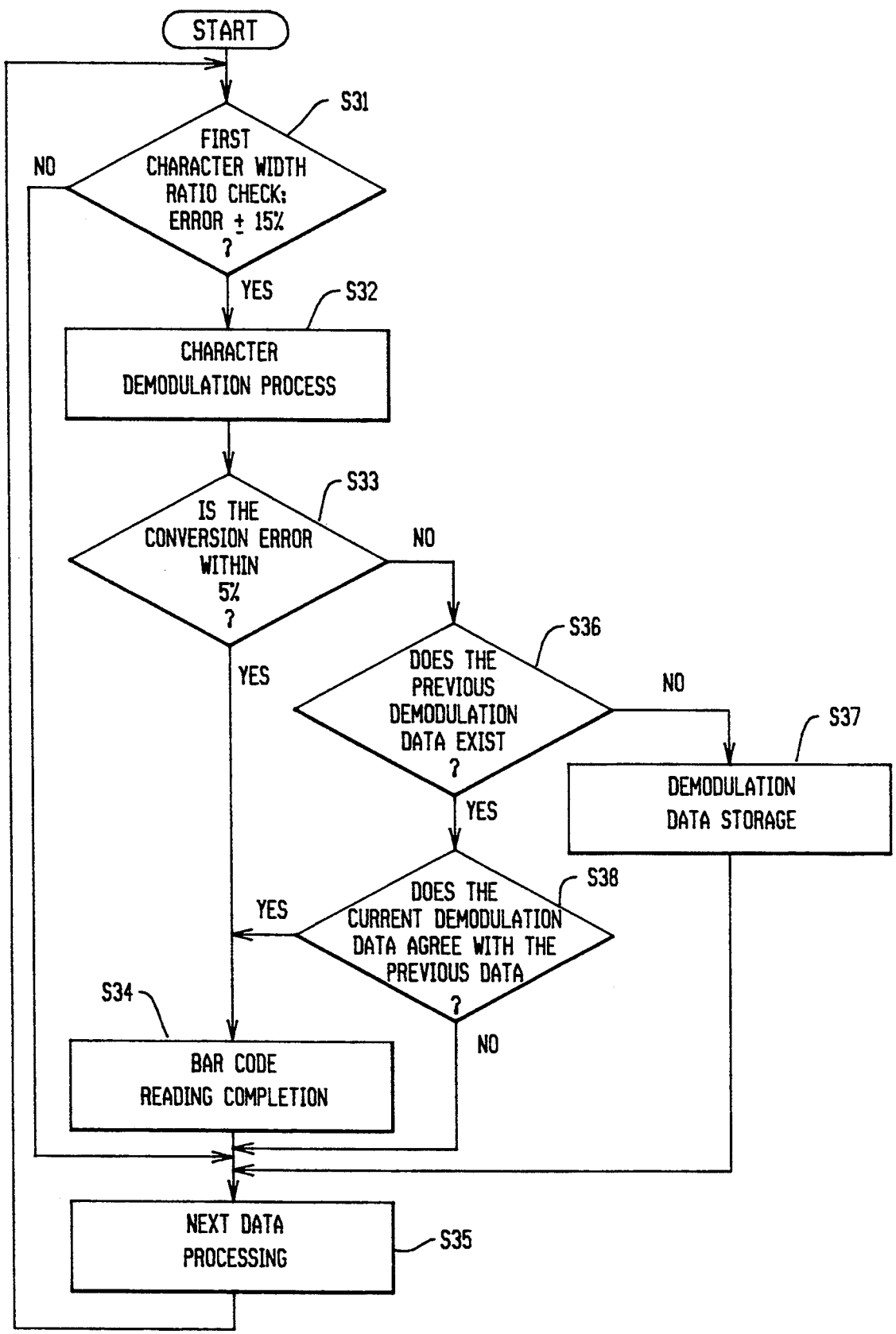
FIG. 5 is a flowchart for explaining the operation of the second embodiment of the present invention.

Next, an explanation will be made below in detail as for the operation of the second embodiment with reference to FIGS. 5 and 6. The CPU 10 scans the laser beam once on the bar code 1, and checks the bar width thereof when the bar width counted value is obtained as for each black bar 1B and each white bar 1W of the bar code 1 (step S31), in the manner similar to the first bar width checking operation according to the conventional art or the first embodiment.

Namely, according to the bar width checking, the character lengths C1 to C6 of the character portions CHR1 to CHR6 are calculated based on the bar with counted value stored in the memory 9. Moreover, the character length ratios C2/C1, C3/C2, C4/C3, C5/C4, and C6/C5 between adjacent character portions CHR1 to CHR6 are calculated based on the character lengths C1 to C6. It is judged whether the character length ratios satisfy the conditions (an error range within ±15%) of the expressions (1) to (7) or not. The character demodulation process (step S32) is performed only when all conditions of the expressions (1) to (7) are satisfied (YES). When any one of the expressions (1) to (7) is not satisfied (NO), it is judged that the reading error of the bar code 1 is large. In this case, the following process (step S35) is performed without processing the character demodulation based on the current bar width counted value.

In the character demodulation process in the step S32, the character demodulation unit 12A calculates two numeral data determining time widths (δ distance length) T01 and T02 of each of the character portions 1CHR to 6CHR, based on the bar width counted value stored in the memory 9. Sequentially, according to the flow shown in FIG. 6, the character demodulation unit 12A judges to what module numbers of 2 to 5 the two time widths T01 and T02 correspond respectively, reads the numerical data corresponding to a combination of the two module numbers by identifying two resultant module numbers with the previously stored table, and demodulates each of the character portions 1CHR to 6CHR, or extracts and demodulates data of the bar code 1.

According to the second embodiment, as shown in FIG. 6, a module number judging process is performed on two time widths T01 and T02 in the character portions 1CHR (~6CHR) while a conversion error calculating process is performed.

In other words, the character demodulation unit 12A judges whether the time width T01 (or T02) is 0.643 or more times the time width C1 of the character portion 1CHR or not (step S40). C1·0.643 is a time width (counted value) for the 4.5 modules. In the module number judging process, it is judged that when the time width T01 (or T02) is a time width of 4.5 or more module numbers, the module number is 5 (step S41). In the similar manner, it is judged that when the time width T01 (or T02) is a time width of module numbers of 3.5 or more to less than 4.5, the module number is 4 (steps S43 and S44). It is judged that when the time width T01 (or T02) is a time width of module number of 2.5 or more to less than 3.5, the module number is 3 (steps S46 and S47). It is judged that when the time width T01 (or T02) is a time width of the module numbers of 1.5 or more to less than 2.5, the module number is 2 (step S49).

In the time width T01 (or T02), after the module number is determined in the step S41, S44, S47, or S49, the dividing means 19 in the distortion amount measuring means 13B divides the time width (δ distance length) T01 and T02 by the resultant module number (5, 4, 3, or 2) (step S42, S45, S48, and S50). Thus, the time width of one module of the time width T01 (or T02) is obtained as a divided value MI.

The error calculating means 20 calculates an error to a predetermined criterion length (a counted value corresponding to the length of one module) of the divided value M1 from the dividing means 19 as a conversion accuracy (conversion error) (step S60). In the error calculating means 20, the criterion length calculating means (not shown) calculates a conversion error (% in unit) by dividing the character lengths C1 (~C6) of the character portion by the module number of 7 of the character portion, calculating a predetermined criterion length (C1/7) of one module, subtracting 1 from the value obtained by dividing the predetermined criterion length by the divided value M1, and then multiplying the subtraction value by 100.

FIG. 6 shows a conversion error calculating process procedure and a module number judging processing procedure for the character portion 1CHR. As for the module number judging process for the other character number portions 2CHR to 6CHR, the time width C1 in the steps S40, S43, S46, and S60 can be replaced for the respective time widths C2 to C6.

As described above, in the module number judging process of the time widths T01 and T02, a character demodulation and a conversion error calculating process are performed. Then according to the present embodiment, the judging means 14B judges whether the conversion error obtained by the conversion accuracy calculating means 18 in the distortion amount measuring means 13B is within an allowable range (5% in this embodiment) or not (step S33).

In the step S33, when it is judged that the conversion error is within 5%, since the reading accuracy of the bar code 1 is high so that it is judged that the erroneous reading of the demodulation data will not occur even if the conventional double coincidence checking is not performed. It is judged immediately that data first extracted and demodulated from the bar code 1 is valid, whereby the reading of the bar code 1 is completed (step S34).

On the other hand, in the step S33, when the conversion error is over 5%, it is judged that the reading error of the bar code 1 is not within a range where it can be judged that demodulation data erroneous reading has not occur at all so that the conventional double coincidence checking (step S36 to S38) is performed. Since the double coincidence checking is completely similar to that in the first embodiment described with the steps S26 to S28 in FIG. 3, the further explanation will be omitted.

According to the present embodiment, the allowable error range of the judging means 14B is set within 5%. However, the allowable error range can be varied by the varying means 15 such as a DIP switch, a bar code setting, and commands from an interface, whereby a user can vary arbitrarily set a desired value (in the case that a decrease in an error reading ratio is a significant problem).

As described above, according to the second embodiment of the present invention, the error of the bar code width (reading distortion amount) is quantitatively evaluated as a conversion error so that the similar function and effect to those of the first embodiment can be obtained.

(d) Explanation of the Third Embodiment

Figure 7:
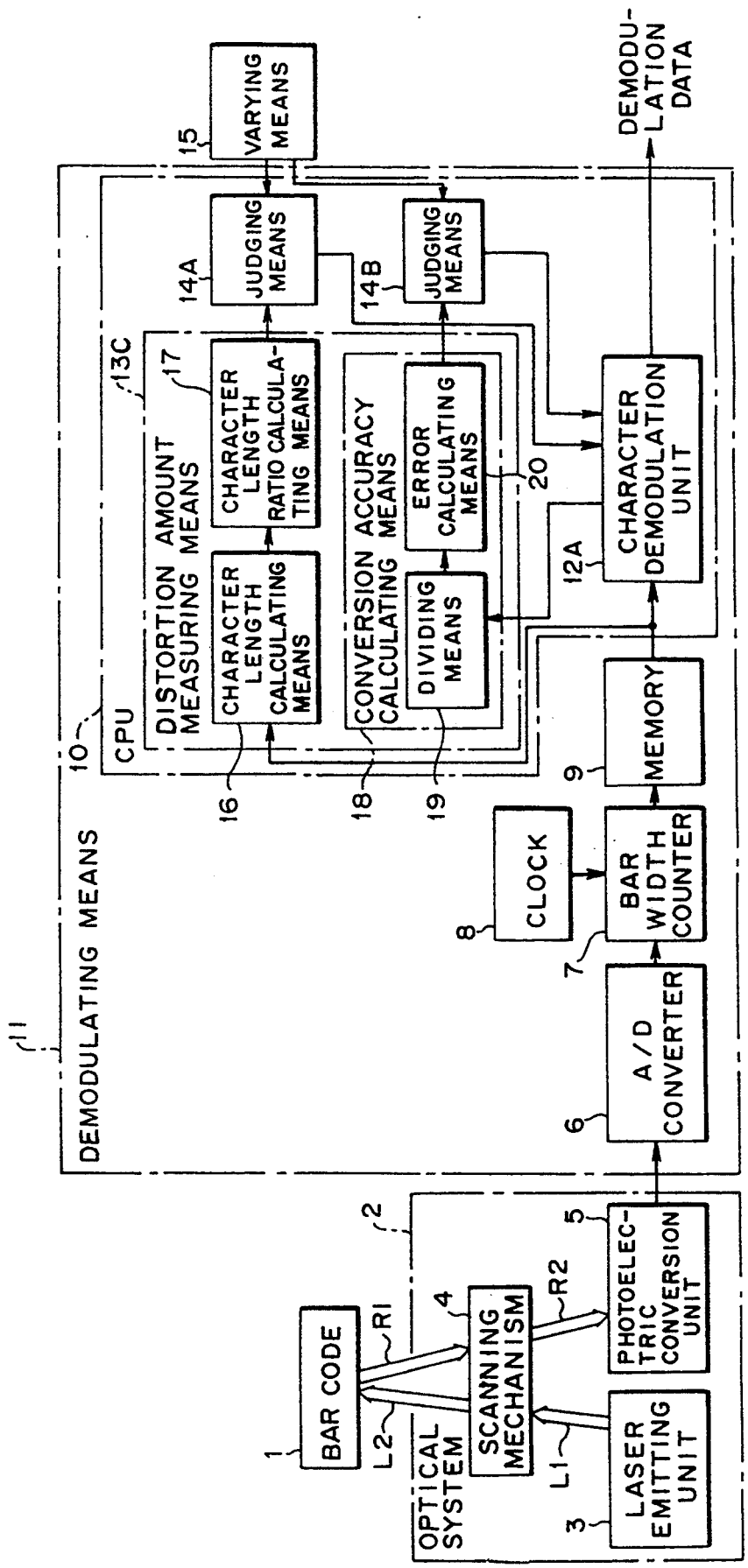
FIG. 7 is a block diagram showing the third embodiment of the present invention.

FIG. 7 is a block diagram showing the third embodiment of the present invention. As shown in FIG. 7, the device according to the present invention has substantially a similar structure to those of the first embodiment shown in FIG. 2 and the second embodiment shown in FIG. 4. However, in the third embodiment, the CPU 10 includes the distortion amount measuring means 13C and the judging means which have a different structure, respectively. In FIG. 7, since like symbols and numerals represent like elements, the duplicate explanation will be omitted.

In the third embodiment, the distortion amount measuring means 13C is formed by combining the distortion amount measuring means 13A of the first embodiment with the distortion amount measuring means 13B of the second embodiment. The judging means 14A and 14B are added to the distortion amount measuring means 13A and 13B, respectively.

The distortion amount measuring means 13C is includes the character length calculating means (length measuring means) 16 and the character length ratio calculating means 17 of the first embodiment, and the conversion accuracy calculating means 18 including the dividing means 19 and the error calculating means 20 of the second embodiment. The CPU 10 also includes the judging means 14A which judges whether the character length ratio from the distortion amount measuring means 13A is within a predetermined allowable ratio (where the first bar width checking satisfies the conditions of the expressions (1) to (7) and the second bar width checking satisfies the conditions of the expressions (8) to (14)) or not, and the judging means 14B which judges whether the conversion error from the distortion amount measuring means 13B is within a predetermined allowable range (5% in this embodiment) or not.

In the character demodulation unit 12A of the present embodiment, when the judging means 14B judges that the conversion error is within 5% and the judging means 14A judges in the second bar width checking that each of the character length ratio satisfying all conditions of the expressions (8) and (14) is within an error range, the data extracted and demodulated from the bar code 1 is valid, the reading of the bar code 1 is completed. If the judging means 14B judges that the conversion error is over 5%, the judging means 14A judges that any one of the conditions of the expressions (8) and (14) is not satisfied in the second bar width checking and any one of each character length ratio is not within an error range, the data extracted and demodulated from the bar code 1 is valid only when the same data from the bar code 1 has been extracted and demodulated continuously and twice as described later with FIG. 8, the reading of the bar code 1 is completed.

Like the first and second embodiments, varying means 15 which can be set variably the predetermined allowable range (an error range) to a predetermined value of the judging means 14A and 14B are added to the CPU 10.

Figure 8:
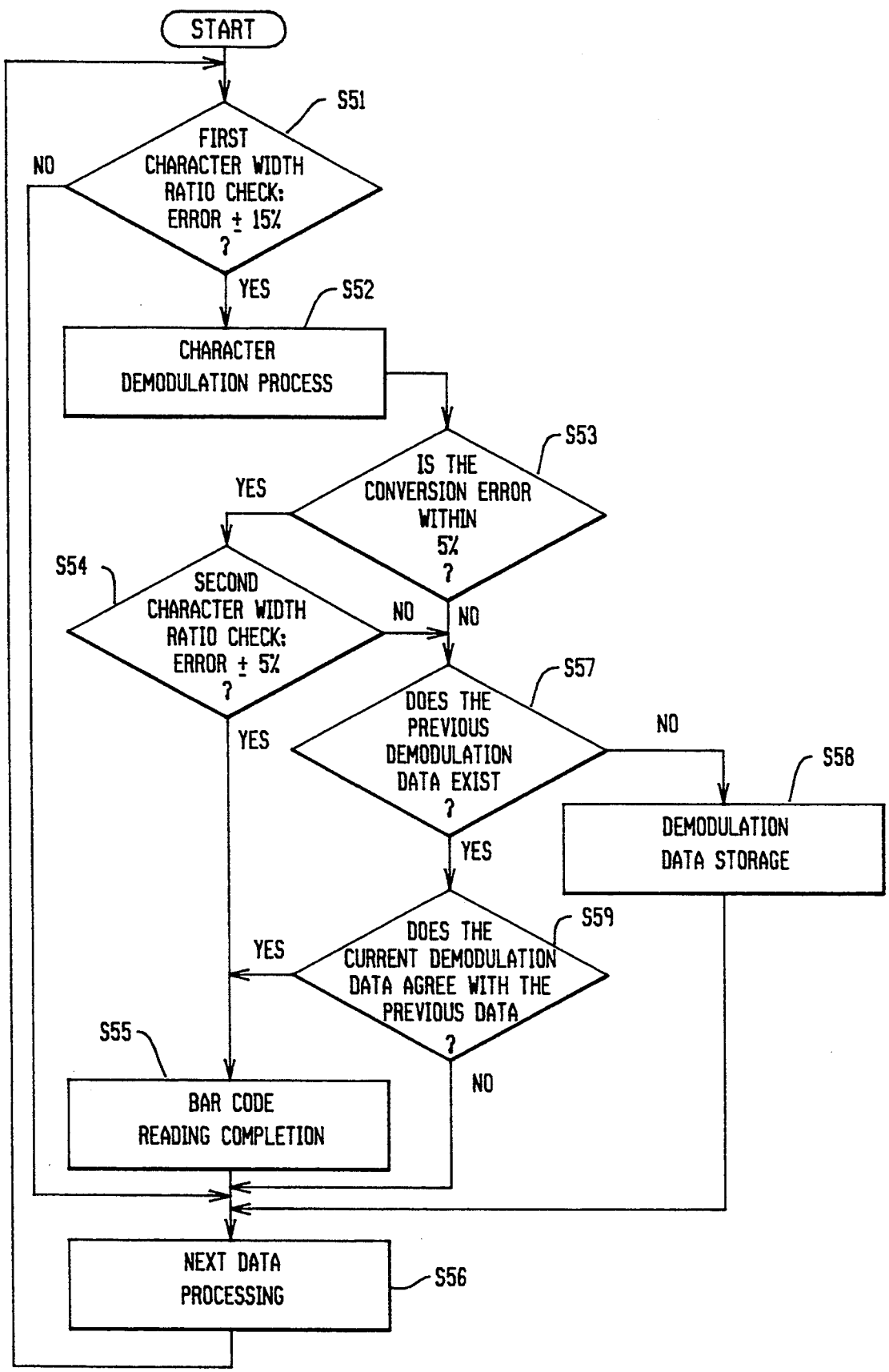
FIG. 8 is a flowchart for explaining the operation of the third embodiment of the present invention.
Figure 9:
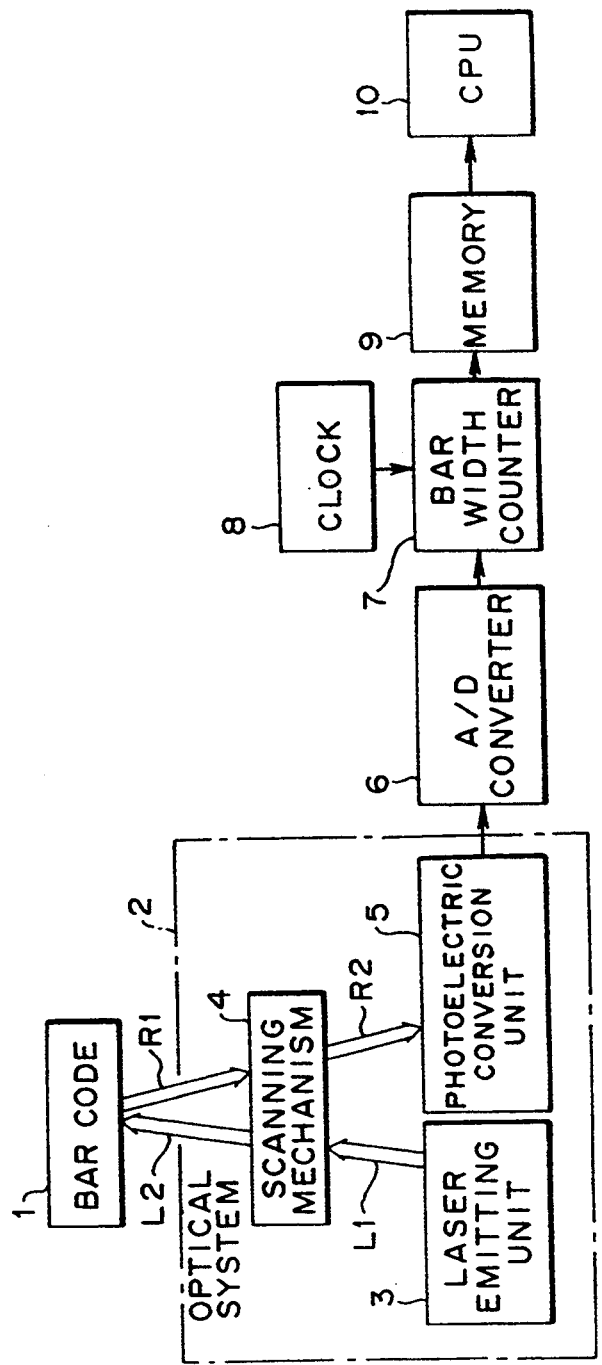
FIG. 9 is a block diagram showing the structure of a bar code reader.

Next, an explanation will be made below in detail as for the operation of the third embodiment with reference to FIG. 8. First the CPU 10 performs the similar bar width checking (step S51) to those of the first embodiment and the prior art when the bar code 1 is scanned once with the laser beam L2, and the counted values of the bar widths of each black bar 1B and each white bar 1W forming the bar code 1 are obtained.

That is, in the first bar width checking, the character lengths C1 to C6 of the character portions CHR1 to CHR6 are calculated based on the bar width counted value stored in the memory 9. Furthermore, the character length ratios C2/C1, C3/C2, C4/C3, C5/C4, and C6/C5 between adjacent character portions CHR1 to CHR6 are calculated based on the character length C1 to C6. It is judged whether each of the character length ratios satisfies the conditions (an error range within ±15% of the expressions (1) to (7) or not. The character demodulating process is performed (step S56) only when all the conditions of the expressions (1) to (7) are satisfied (YES). If any one of the expressions (1) to (7) is not satisfied conditionally (NO), it is judged that the reading error of the bar code 1 is large. Thus, the step advances to the next data process (step S56) without performing the character demodulation process in accordance with the bar width counted value obtained currently.

In the character demodulation process in the step S52, the character demodulation unit 12A calculates two time widths ($\delta$ distance length) T01 and T02 determining numerical data for respective character portions 1CHR to 6CHR, based on the bar width counted value stored in the memory 9, judges whether to what module number of 2 to 5 the two time widths T01 and T02 correspond in accordance with the procedure shown in FIG. 6, reads numerical data corresponding to a combination of the two module numbers by identifying the resultant two module number with a previously stored table, and demodulating the character portions 1CHR to 6CHR or extracting-and demodulating data of the bar code 1.

Like the second embodiment, even in the third embodiment, according to the procedure shown in FIG. 6, a module number judging process is performed on two time widths T01 and T02 of the character portions 1CHR (~6CHR) while the conversion error calculating process is performed.

Then, in the present embodiment, the judging means 14B judges whether the conversion error obtained by the conversion accuracy calculating means 18 in the distortion amount measuring means 13B is within a predetermined allowable range (5% in this embodiment) or not (step S53), and the distortion amount measuring means 13A and the judging means 14A performs the second bar width checking when the conversion error is within 5% (step S54).

In the second bar width checking, the judging means 14A judges whether the character length ratios C2/C1, C3/C2, C4/C3, C5/C4, and C6/C5, obtained by the character length calculating means 16 and the character length ratio calculating means 17 in the distortion amount measuring means 13A, satisfy the conditions (error range within ±5%) of the expressions (8) to (14) or not. If all the conditions of the expressions (8) to (14) are satisfied (OK), since the reading accuracy of the bar code 1 is high, it is judged that an erroneous reading to the demodulation data will not occur even if the conventional double coincidence checking is not performed. Hence it is judged immediately that data first extracted and demodulated from the bar code 1 is valid, whereby the reading of the bar code 1 is completed (step S55).

When it is judged in the step S53 that the conversion error is over 5%, or the any one of the conditions of the expressions (8) to (14) is not satisfied (NO), it is judged that the reading error of the bar code 1 is not within a range where it can not be judged that the demodulation data erroneous reading has not occur at all, whereby the conventional double coincidence checking (steps S57 to S59) is performed. Since the double coincidence checking is identical to that of the first embodiment described in the steps S26 to S28 in FIG. 3, the duplicate explanation will be omitted.

According to the present embodiment, the allowable error range of the judging means 14A is set to two values of +15% and +5%, and the allowable error range of the judging means 14B is set within 5%. Like the first embodiment, the allowable range can be varied using varying means 5 such as a DIP switch, bar code setting, and commands from an interface, so a user can set the range arbitrarily at a desired value (in the case that a decrease in an erroneous reading is significant).

As described above, the third embodiment of the present invention has the similar functions and effects to the first embodiment. In the third embodiment, two data, or the character length ratio between the adjacent characters and the conversion accuracy to the module number of a δ distance value length, are calculated and used as a reading distortion amount, so that the error of the bar code width can be evaluated quantitatively at higher reliability to reduce further the erroneous reading ratio.

In the above embodiments, as shown in FIG. 10, it has been explained that six character portions 1CHR to 6CHR are arranged between the guide bar GB and the special center bar SCB. There are various kinds of bar codes. For example, as shown in FIG. 10, the bar code 1 includes a special center bar SCB on the right side as a center bar arranged at the center thereof and formed of two black bars 1B of one module and two white bars 1W of one module, and a character portion arranged on the right end and the left end thereof. Like the above embodiments, any type of bar codes are applicable for the device and method according to the present invention and provide the similar functions and effects.

In the above embodiments, if the reading distortion amount is over the predetermined allowable range, data extracted and demodulated from the bar code 1 is judged to be valid only when the same data from the bar code 1 is extracted and demodulated continuously twice (the double coincidence checking). However, as for the coincidence checking operation, the number is not necessarily limited to two times. The coincidence checking may be repeated three times or more (or the same data is extracted and demodulated continuously and three times or more).

What is claimed is:

1. A bar code reading method wherein a beam light is irradiated and scanned to a bar code and data of the bar code is extracted and demodulated based on the light amount of a reflection light of said beam light, comprising the steps of:
    measuring a reading distortion amount of said bar code;
    judging data extracted and demodulated from said bar code as valid data when said reading distortion amount measured is within a predetermined allowance range, whereby said bar code reading is completed; and
    judging data extracted and demodulated from said bar code as valid data if said data from said bar code is extracted and demodulated continuously and at least twice when said reading distortion amount measured is not within said predetermined allowance range, whereby said bar code reading is completed.

2. A bar code reading method according to claim 1, wherein said bar code reading distortion amount is a character length ratio between adjacent characters which are obtained by calculating and measuring based on the character lengths of plural characters forming said bar code.

3. A bar code reading method according to claim 1, wherein said bar code reading distortion amount is a δ distance length to a module number conversion accuracy calculated and measured when said δ distance length is converted into a module number to extract and demodulate data of said bar code, said δ distance length being obtained for every character to specify data of plural characters forming said bar code, said module number counting one module as a predetermined criterion length.

4. A bar code reading method according to claim 1, wherein said bar code reading distortion amounts are a character length ratio between adjacent characters and a δ distance length to a module number conversion accuracy calculated and measured when said δ distance length is converted into a module number to extract and demodulate data of said bar code; said character length ratio being obtained by calculating and measuring based on the characteristic length of plural characters; said δ distance length being obtained for every character to specify data of plural characters forming said bar code; said module number counting one module as a predetermined criterion length.

5. A bar code reading method according to claim 3, wherein said δ distance length to module number conversion accuracy is calculated as an error to said predetermined criterion length of a value obtained by dividing said δ distance length by said module number.

6. A bar code reading method according to claim 4, wherein said δ distance length to module number conversion accuracy is calculated as an error to said predetermined criterion length of a value obtained by dividing said δ distance length by said module number.

7. A bar code reading method according to claim 5, wherein said predetermined criterion length is calculated as a value obtained by dividing a character length of said character by said module number of said character.

8. A bar code reading method according to claim 6, wherein said predetermined criterion length is calculated as a value obtained by dividing a character length of said character by said module number of said character.

9. A bar code reader comprising:
    a light source for emitting a beam light;
    scanning means for scanning said beam light from said light source to irradiate to a bar code;
    photoelectric converting means for receiving a reflection light of said beam light from said bar code to convert it into an electric signal corresponding to the light amount thereof; and
    demodulating means for extracting and demodulating data of said bar code based on said electric signal from said photoelectric converting means;
    said demodulating means including:
        distortion amount measuring means for calculating and measuring the reading distortion amount of said bar code; and
        judging means for judging whether said reading distortion amount calculated and measured by said distortion amount measuring means is within a predetermined allowable range or not;
    whereby said demodulating means judges that the data extracted and demodulated from said bar code is valid when said judging means judges that said reading distortion amount is within said allowable range, and then completes the bar code reading operation;

whereby said demodulating means judges that the data extracted and demodulated from said bar code is valid only when the data of said bar code can be extracted and demodulated continuously and at least twice when said judging means judges that said reading distortion amount is not within said allowable range, and then completes the bar code reading operation.

10. A bar code reader according to claim 9, wherein said distortion amount measuring means comprises:

length measuring means for measuring the character lengths of plural characters forming said bar code; and character length ratio calculating means for calculating a character length ratio between adjacent characters as said bar code reading distortion amount based on the character length of each character measured by said length measuring means.

11. A bar code reader according to claim 9, wherein said distortion amount measuring means comprises a converting accuracy calculating means for calculating a $\delta$ distance length to module number converting accuracy as said bar code reading distortion amount when said 5 distance length is converted into a module number to extract and demodulate data of said bar code, said $\delta$ distance length being obtained for every character to specify data of plural characters forming said bar code, said module number counting one module as a predetermined criterion length.

12. A bar code reader according to claim 9, wherein said distortion amount measuring means comprises:

length measuring means for measuring the character lengths of plural characters forming said bar code;

character length ratio calculating means for code calculating, as a reading distortion amount of said bar code, a character length ratio between adjacent characters based on the character length of each character measured by said length measuring means; and a conversion accuracy calculating means for calculating a $\delta$ distance length to module number converting accuracy as said bar code reading distortion amount when said $\delta$ distance length is converted into a module number to extract and demodulate data of said bar code, said $\delta$ distance length being obtained for every character to specify data of plural characters forming said bar code, said module number counting one module as a predetermined criterion length.

13. A bar code reader according to claim 11, wherein said conversion accuracy calculating means comprises:

dividing means for dividing said $\delta$ distance length by said module number; and error calculating means for calculating an error to said predetermined criterion length of a divided value from said dividing means as said conversion accuracy.

14. A bar code reader according to claim 12, wherein said conversion accuracy calculating means comprises:

dividing means for dividing said $\delta$ distance length by said module number; and error calculating means for calculating an error to said predetermined criterion length of a divided value from aid dividing means as said conversion accuracy.

15. A bar code reader according to claim 13, further comprising criterion length calculating means for calculating said predetermined criterion length as a value that the character length of said character is divided by a module number of said character.

16. A bar code reader according to claim 14, further comprising criterion length calculating means for calculating said predetermined criterion length as a such that the character length of said character is divided by a module number of said character.

17. A bar code reader according to claim 9, further comprising varying means for varying said predetermined allowable range of said judging means to a set value.

18. A bar code reader according to claim 10, further comprising varying means for varying said predetermined allowable range of said judging means to a set value.

19. A bar code reader according to claim 11, further comprising varying means for varying said predetermined allowable range of said judging means to a set value.

20. A bar code reader according to claim 12, further comprising varying means for varying said predetermined allowable range of said judging means to a set value.

21. A bar code reader according to claim 13, further comprising varying means for varying said predetermined allowable range of said judging means to a set value.

22. A bar code reader according to claim 14, further comprising varying means for varying said predetermined allowable range of said judging means to a set value.

23. A bar code reader according to claim 15, further comprising varying means for varying said predetermined allowable range of said judging means to a set value.

24. A bar code reader according to claim 16, further comprising varying means for varying said predetermined allowable range of said judging means to a set value.

* * * * *

UNITED STATES PATENT AND TRADEMARK OFFICE
CERTIFICATE OF CORRECTION

PATENT NO. : 5,393,968
DATED : February 28, 1995
INVENTOR(S) : Watanabe et al.

It is certified that error appears in the above-indentified patent and that said Letters Patent is hereby corrected as shown below:

Column 1, line 35, delete "the L2".

Column 1, line 63, delete "AID" and insert --A/D--.

Column 2, line 52, delete "the".

Column 3, line 18, delete "numbers" and insert --number--.

Column 3, line 62, delete "on".

Column 4, line 11, delete "C2" and insert --C3--.

Column 4, line 37, after "calculated" insert --for--.

UNITED STATES PATENT AND TRADEMARK OFFICE
CERTIFICATE OF CORRECTION

PATENT NO. : 5,393,968
DATED : February 28, 1995
INVENTOR(S) : Watanabe et al.

It is certified that error appears in the above-indentified patent and that said Letters Patent is hereby corrected as shown below:

Column 5, line 39, delete "occurs" and insert --may occur--.

Column 5, line 42, after "types" insert --of distortion--.

Column 7, line 49, delete "Then" and insert --The--.

Column 8, line 36, move "FIG. 6" to the start of the next line.

Column 10, line 66, delete "two".

Column 12, line 65, delete "calculates" and insert --calculate,--.

Column 13, line 30, after "extracted" insert --and demodulated--.

Column 16, line 64, after "beam" insert --L2--.

Column 17, line 65, delete "MI" and insert --M1--.

Column 19, line 13, delete "is".

UNITED STATES PATENT AND TRADEMARK OFFICE
CERTIFICATE OF CORRECTION

PATENT NO. : 5,393,968
DATED : February 28, 1995
INVENTOR(S) : Watanabe et al.

It is certified that error appears in the above-indentified patent and that said Letters Patent is hereby corrected as shown below:

Column 20, line 59, before "any" delete --the--.

Column 21, line 3, delete "+15%" and insert --±15%--.

Column 21, line 3, delete "+5%" and insert --±5%--.

Column 23, line 26, delete "5" and insert --$\delta$--.

Column 24, line 20, before "such" insert --value--.

Signed and Sealed this

Fifth Day of March, 1996

BRUCE LEHMAN

*Attest:*

*Attesting Officer*     Commissioner of Patents and Trademarks